(12) United States Patent
Diels et al.

(10) Patent No.: US 11,821,838 B1
(45) Date of Patent: Nov. 21, 2023

(54) SPECTROSCOPY IN FREQUENCY, TIME, AND POSITION WITH CORRELATED FREQUENCY COMBS

(71) Applicants: Jean-Claude Diels, Albuquerque, NM (US); Ladan Arissian, Albuquerque, NM (US)

(72) Inventors: Jean-Claude Diels, Albuquerque, NM (US); Ladan Arissian, Albuquerque, NM (US)

( * ) Notice: Subject to any disclaimer, the term of this patent is extended or adjusted under 35 U.S.C. 154(b) by 84 days.

(21) Appl. No.: 17/335,867

(22) Filed: Jun. 1, 2021

Related U.S. Application Data

(60) Provisional application No. 63/032,872, filed on Jun. 1, 2020.

(51) Int. Cl.
| | | |
|---|---|---|
| *G01N 21/39* | (2006.01) | |
| *G01N 21/41* | (2006.01) | |
| *G01N 21/49* | (2006.01) | |
| *G01N 21/55* | (2014.01) | |
| *G01N 22/00* | (2006.01) | |

(52) U.S. Cl.
CPC ............ *G01N 21/39* (2013.01); *G01N 21/41* (2013.01); *G01N 21/49* (2013.01); *G01N 21/55* (2013.01); *G01N 22/00* (2013.01); *G01N 2021/4106* (2013.01); *G01N 2201/06113* (2013.01)

(58) Field of Classification Search
CPC ........ G01N 21/39; G01N 21/41; G01N 21/49; G01N 21/55; G01N 22/00; G01N 2021/4106; G01N 2201/06113
See application file for complete search history.

(56) References Cited

U.S. PATENT DOCUMENTS

| | | | | | |
|---|---|---|---|---|---|
| 5,251,230 | A | * | 10/1993 | Lai | G01C 19/665 372/18 |
| 5,367,528 | A | * | 11/1994 | Diels | G01C 19/70 372/18 |
| 8,488,639 | B1 | * | 7/2013 | Diels | H01S 3/1112 372/18 |

(Continued)

OTHER PUBLICATIONS

Afkhamiardakani, Hanieh, et al., "Controlling group and phase velocities in bidirectional mode-locked fiber lasers", Optics Letters, vol. 44, Issue 11, (2019), 6 pgs.

(Continued)

*Primary Examiner* — Violeta A Prieto
(74) *Attorney, Agent, or Firm* — Schwegman Lundberg & Woesner, P.A.

(57) ABSTRACT

Apparatus, systems, and methods associated with remote phase and amplitude spectroscopy in frequency, time, and position with correlated frequency combs are applicable in a variety of applications. Multiple beams can be generated from a single laser source, where, in the frequency domain, the multiple beams are frequency combs with equal repetition rates and shifted in frequency from each other. One or more of the multiple beams can be directed to interact with a sample with another one of the multiple beams used as a reference beam. The interaction can include transmission of one of the multiple beams as a signal beam through the sample, reflection of one of the multiple beams as a signal beam from the sample, or backscattering from the sample. Results from the interaction can be analyzed.

20 Claims, 8 Drawing Sheets

(56) References Cited

U.S. PATENT DOCUMENTS

| | | | |
|---|---|---|---|
| 9,653,877 B1* | 5/2017 | Arissian | G01N 21/41 |
| 9,859,677 B1* | 1/2018 | Arissian | H01S 3/0957 |
| 10,533,836 B2* | 1/2020 | Cundiff | G01J 3/12 |
| 2005/0018208 A1* | 1/2005 | Levinson | G03F 7/70341 |
| | | | 356/517 |
| 2017/0187161 A1* | 6/2017 | Fermann | H01S 3/1112 |
| 2018/0073856 A1* | 3/2018 | Cundiff | G01N 21/31 |

OTHER PUBLICATIONS

Bartels, A., et al., "10-GHz Self-Referenced Optical Frequency Comb", Science, vol. 326, (2009), 681.

Bartels, A., et al., "Passively mode-locked 10 GHz femtosecond Ti:sapphire laser", Optics Letters, vol. 33, No. 16, (Aug. 15, 2008), 1905-1907.

Fortier, T. M., et al., "Octave-spanning Ti:sapphire laser with a repetition rate > 1 GHz for optical frequency measurements and comparisons", Optics Letters, vol. 31, (2006), 1011-1013.

Fortier, Tara, et al., "20 years of developments in optical frequency comb technology and applications", Communications Physics (2019) 2:153, 16 pgs.

Fortier, Tara, et al., "Author Correction: 20 years of developments in optical frequency comb technology and applications", Communications Physics (2020) 3:85, 2 pgs.

* cited by examiner

SPECTROSCOPY IN FREQUENCY, TIME, AND POSITION WITH CORRELATED FREQUENCY COMBS

Related Application

This application claims priority under 35 U.S.C. 119(e) from U.S. Provisional Application Ser. No. 63/032,872, filed 1 Jun. 2020, which application is incorporated herein by reference in its entirety.

Field of the Invention

The invention relates generally to frequency combs and to systems and devices for the generation and/or use of the same.

Background

An optical frequency comb is an optical spectrum of equidistant lines. The use of frequency combs as a tool may depend on the spacing between teeth (lines) of the comb. Mode-locked lasers can provide accurate frequency combs. A mode-locked laser produces a stream of identical pulses, which can have a duration of only, several femtoseconds, at a repetition rate typically in the range up to 10 GHz. See, for example, T. M. Fortier, A. Bartels, and Scott A. Diddams; "Octave-spanning Ti:sapphire laser with a repetition rate >1 GHz for optical frequency measurements and comparisons," Optics Letters, 31:1011-1013, 2006; A. Bartels, D. Heinecke. and S. A. Diddams; "Passively mode-locked 10 GHz femtosecond Ti:sapphire laser," Optics Letters, 33:1905-1907, 2008, and A, Bartels, D. Heinecke, and S.A. Diddams; "10-GHz Self-Referenced Optical Frequency Comb," Optics Lett., Science:681, 2009. In the frequency domain, the laser output consists of a frequency comb having equidistant lines. Because these lines are exactly equally spaced, this frequency comb can be used as a ruler for optical frequencies. Frequency combs may provide enhancements in other areas of measurement.

BRIEF DESCRIPTION OF THE DRAWINGS

The drawings, which are not necessarily drawn to scale, illustrate generally, by way of example, but not by way of limitation, various embodiments discussed in the present document.

DETAILED DESCRIPTION

The following detailed description refers to the accompanying drawings that show, by way of illustration, various embodiments that can be implemented. These embodiments are described in sufficient detail to enable those of ordinary skill in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a method can be implemented to detect simultaneously absorption, changes in index of refraction, and turbulences at a remote site exploiting the properties of two correlated frequency combs generated by the same laser. Frequency combs generated by the same laser can be used to detect simultaneously absorption, changes in index of refraction, and turbulence in a gas. Frequency combs generated by the same laser can be used to detect simultaneously, absorption, changes in index of refraction, and structural changes in a solid. Such detections can be conducted remotely. Procedures using frequency combs can be a powerful tool to analyze and localize pollutants at a distance of several kilometers (kms). Such procedures, for example, can be based on the properties of two correlated frequency combs generated by the same laser.

Figure 1:
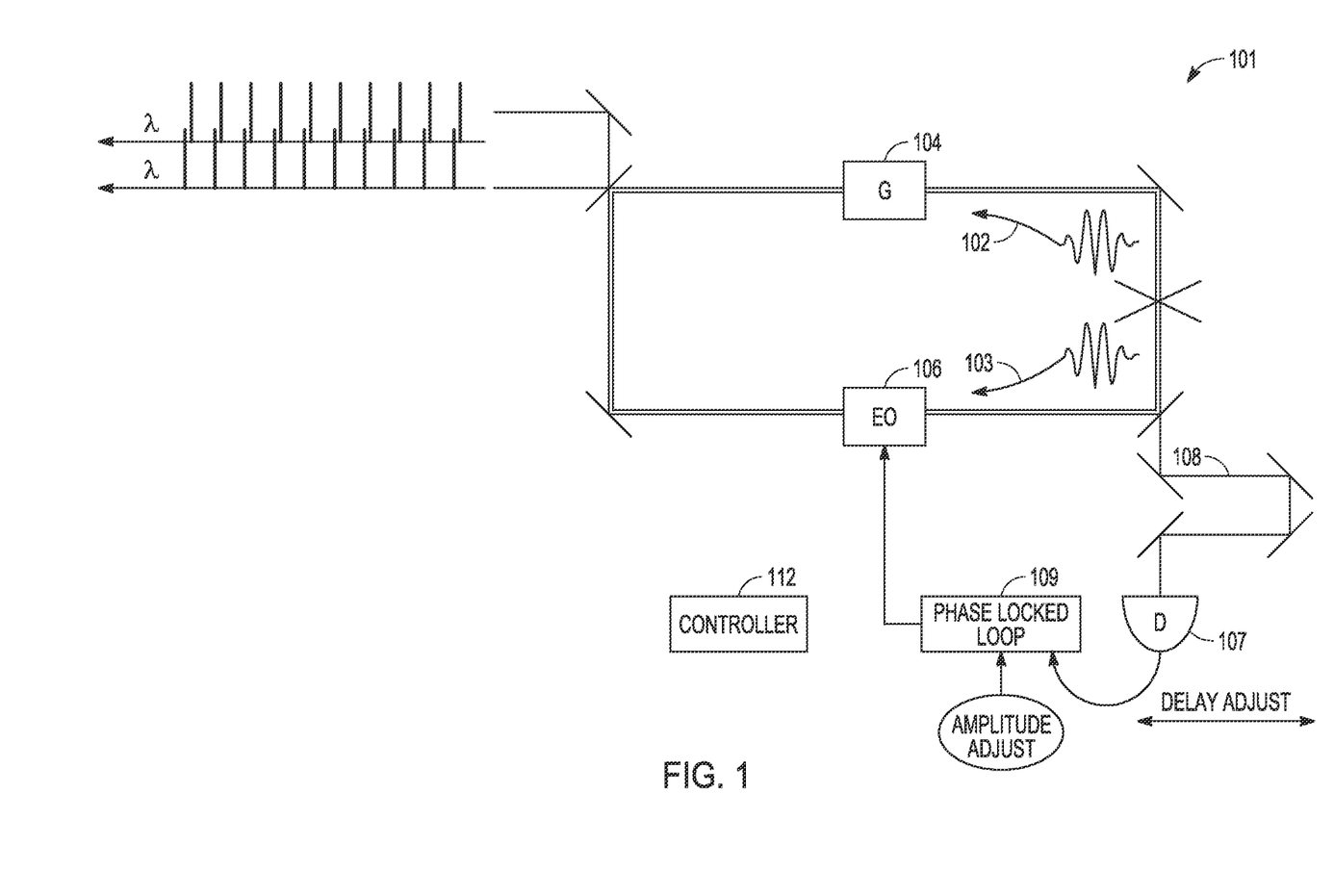
FIG. 1 illustrates an example source of frequency correlated combs using a ring laser, according to various embodiments.
Figure 2:
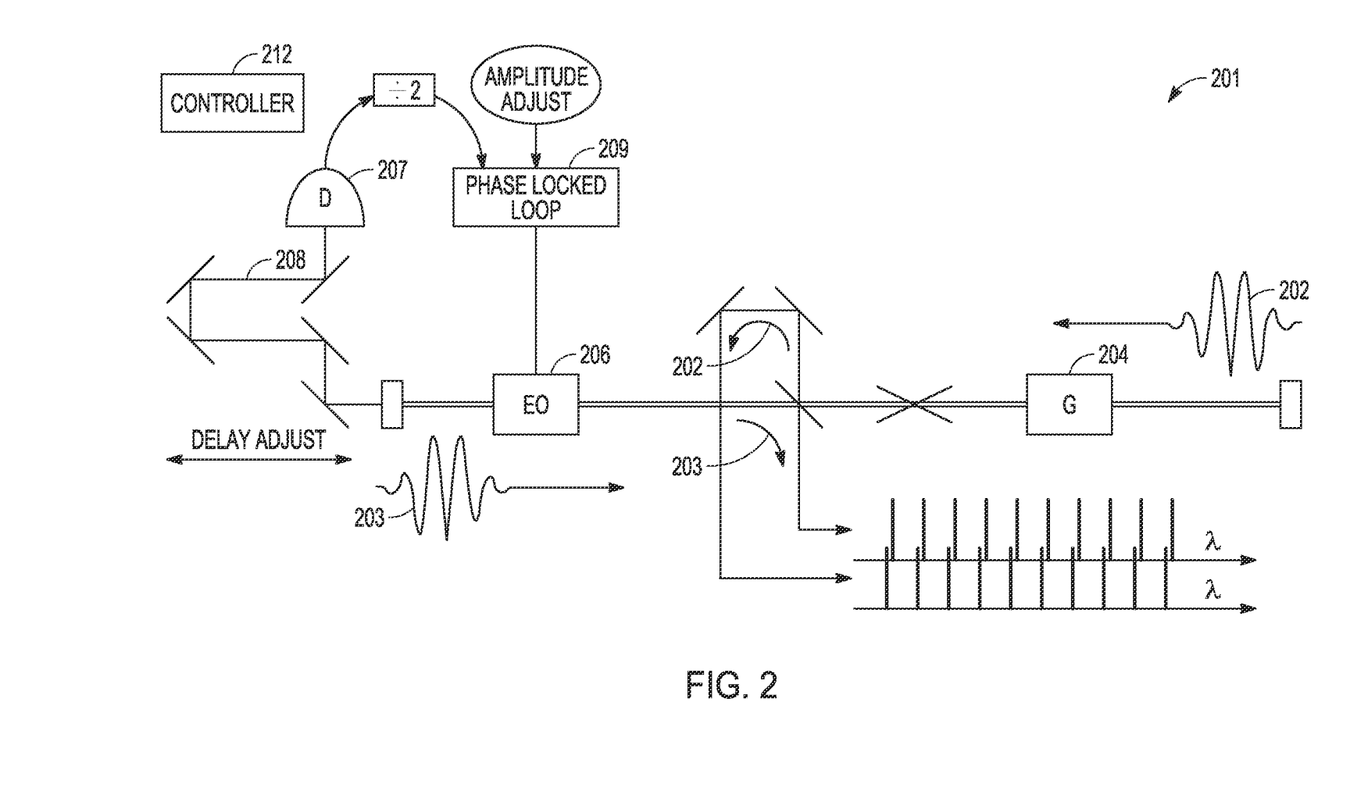
FIG. 2 illustrates an example source of correlated frequency combs with a laser in a linear arrangement, according to various embodiments.

A laser "dual comb source" emits two frequency combs with the same repetition rate (tooth spacing of the comb), but slightly shifted in frequency. The frequency shift between the two frequency combs can be adjusted with a phase modulator inserted in the laser cavity, with the frequency shift being in the range of a hertz (Hz) to several gigahertz (GHz). Two example configurations of such a laser dual comb source are shown in FIGS. 1 and 2. FIG. 1 illustrates an embodiment of an example source of correlated frequency combs using a ring laser. FIG. 2 illustrates an embodiment of an example source of correlated frequency combs with a laser in a linear arrangement. In both cases, two pulses, pulses 102 and 103 in FIG. 1 and pulses 202 and 203 in FIG. 2, circulate in the laser cavity, and meet at a fixed point. The fixed meeting point can be achieved, but is not limited to, using a saturable absorber. A fixed meeting point (implying the same repetition rate for both pukes) can be provided if the gain G in the laser cavity is produced by a nonlinear crystal (gain medium 104 in FIG. 1 and gain medium 204 in FIG. 2) pumped at a shorter wavelength than that of the circulating pulses.

Two pulse trains are generated by laser dual comb sources 101 and 201, in the frequency spectrum, corresponds to two identical frequency combs. The relative frequency of the two combs can be shifted by means of a detector (D) (D 107 in FIG. 1 and D 207 in FIG. 2) and an electro-optic phase modulator (EO) (EO 106 in FIGS. 1 and EO 206 in FIG. 2).

Figure 3:
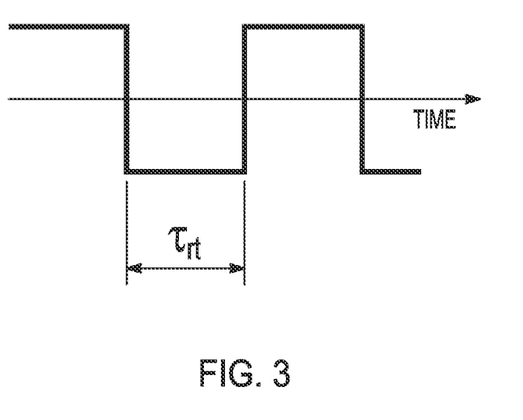
FIG. 3 shows a periodic wave with a period equal to the repetition rate of the laser sources of FIGS. 1 and 2, according to various embodiments.

Each of EO 106 and EO 206 can be realized by a slab of lithium niobate coated with two electrodes. Other formats can be implemented for an EO. Successive pulses 103, in FIG. 1, hitting D 107, are sent to a phase locked loop 109 to generate a periodic wave, such as a sine wave or as a square wave as shown in FIG. 3, with a period equal to the repetition rate, $\tau_{rt}$, of the laser dual comb source 101. Successive pulses 203, in FIG. 2, hitting D 207 are sent to a phase locked loop 209 to generate a periodic wave, such as a sine wave or as a square wave as shown in FIG. 3, with a period equal to the repetition rate, $\tau_{rt}$, of the laser dual comb source 201. With proper adjustment of an optical delay line 108, the electric signal applied to the crystal will be maximum when the crystal in FIG. 1 transmits pulse 103, and minimal when pulse 102 traverses the crystal. Therefore, pulse 102 and pulse 103 in laser dual comb sources 101 of FIG. 1 see different cavity lengths. Likewise, with proper adjustment of an optical delay line 208, the electric signal applied to the crystal will be maximum when the crystal in FIG. 2 transmits pulse 203, and minimal when the pulse 202 traverses the crystal. Therefore, pulse 202 and pulse 203 in laser dual comb sources 201 of FIG. 2 see different cavity lengths. Since the optical frequency is determined by the length of a resonator, the two frequency combs in each of laser dual comb sources 101 and 201 of FIGS. 1 and 2, respectively, will be shifted with respect to each other by an amount proportional to the voltage applied on modulator EO 106 and on modulator EO 206, respectively.

The arrangement of laser dual comb source 101 can include a controller 112 operable with optical delay line 108, detector 107, and phase locked loop 109. Controller 112 can be implemented to control amplitude adjustment of phase locked loop 109, which adjusts EO 106, and to control delay adjustment of optical delay line 108. The delay adjustment to optical delay line 108 can be realized using instrumentality to move mirrors associated with optical delay line 108. Such instrumentality can include piezoelectric components. Likewise, the arrangement of laser dual comb source 201 can include a controller 212 operable with optical delay line 208, detector 207 and phase locked loop 209. Controller 212 can be implemented to control amplitude adjustment of phase locked loop 209, which adjusts EO 206, and to control delay adjustment of optical delay line 208. The delay adjustment can be realized using instrumentality to move mirrors associated with optical delay line 208. Such instrumentality can include piezoelectric components. The difference between the two configurations illustrated in FIGS. 1 and 2 is that in linear laser 201, the signal output from D 207 is at twice the repetition rate of the laser cavity. Also, in the linear case, the two pulses 202 and 203 propagate through each element of the cavity in the same order.

Figure 4:
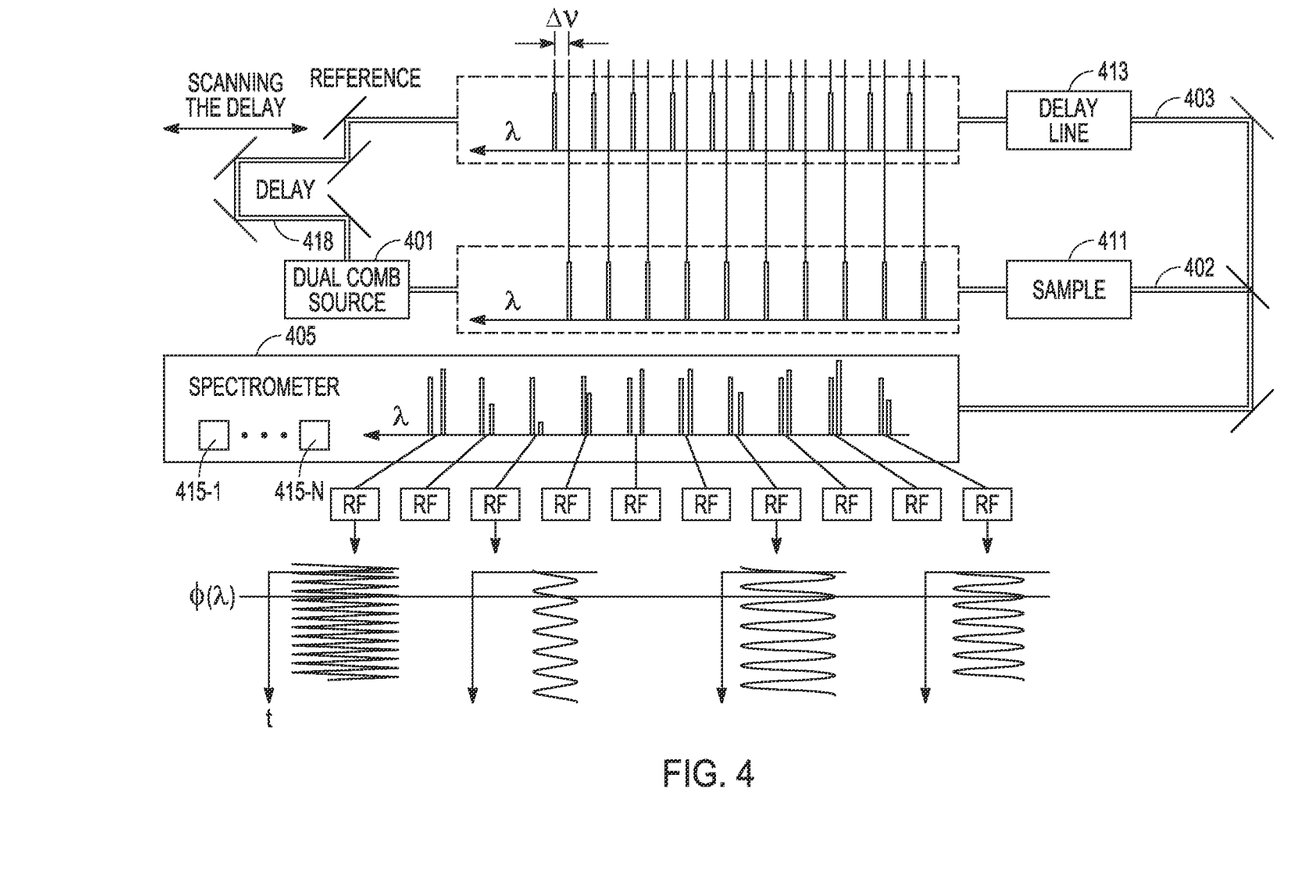
FIG. 4 illustrates an example arrangement of a dual comb source and a spectrometer with respect to a sample to be investigated, according to various embodiments.

FIG. 4 illustrates an embodiment of an example arrangement of a dual comb source 401 and a spectrometer 405 with respect to a sample 411 to be investigated. The dual comb source 401 emits two beams, which can be labeled a reference beam 403 and a signal beam 402, where each of the two beams consists of a train of identical pulses, repeating with the same intra-pulse period $\tau_{rt}$. These two beams are two frequency combs with the same repetition rate (tooth spacing of the comb), but slightly shifted in frequency. In the frequency domain, each of the two laser outputs consists of a comb in frequency, with the same frequency difference $1/\tau_{rt}$ between teeth. The difference between the two spectra is that all the teeth of the sample comb are shifted by the same amount with respect to the teeth of the reference comb, which amount can be finely tuned between 0 and the value of $1/\tau_{rt}$. As noted with respect to the laser dual comb sources 101 and 201 of FIGS. 1 and 2, respectively, the frequency shift between the two frequency combs can be adjusted with a phase modulator inserted in a laser cavity of dual comb source 401. The adjustment can be in the range of a fraction of Hz to several GHz. The lower limit of this range can be set by the type of laser used. For example, the minimum lower limit achieved so far has been 0.05 Hz. The maximum frequency shift between the two combs can be half of the tooth spacing of these combs, which, depending on the type of laser used, can be several MHz (fiber lasers) up to several GHz. The dual comb source 401 can be implemented similar to laser dual comb source 101 of FIG. 1, laser dual comb source 201 of FIG. 2, or other dual comb source arrangement in which the generated frequency combs have the same repetition rate, but different in frequency.

The signal beam 402 is sent through sample 411 to be analyzed. Since the modes are equally spaced, superimposing the two combs on a detector would create a sinusoidal signal (100% depth modulation). The reference beam 403, which is a reference signal, is sent through a delay line 413 to interfere with the signal beam 402. that has traversed sample 411 to be analyzed. The sample and reference combs are interfered in spectrometer 405 for analysis, where the spectrometer 405 can have an array of detectors 415-1 . . . 415-N at its output. Detectors 415-1 . . . 415-N can be radio frequency (RF) detectors. The interference of corresponding teeth can be recorded by the array of RF detectors 415-1 . . . 415-N located at the dispersed output of the spectrometer 405. Each of the detectors 415-1 . . . 415-N sees a sinusoidal signal that carries information on the sample 411 traversed. A sample under measurement is not necessarily investigated in transmission of the signal beam through the sample. A sample can be also investigated in reflection of the signal beam or in backscattering from a gas, liquid, or solid. The information in the measurement can be multidimensional information obtained via determination of parameters including, but not limited to, frequency, modulation depth, relative phase between detectors, and resonances in the sample found by scanning of the dual frequency difference (for instance, Brillouin scattering resonance).

A number of different types of information can be extracted using a dual comb laser source arrangement. In the case of backward scattering from gases and aerosols, the frequency of the beat signal on each RF detector may be different from the applied frequency shift, indicating, for instance, a Doppler shift from scattering particles.

The information extracted can be for a sample being a transparent medium, for example, for atmospheric propagation. Information on dispersion can be extracted. The relative phase between the various RF signals detected at the different wavelengths gives a complete mapping of the dispersion of the sample. Parts of the spectrum propagate at different velocities. The different group velocities can be detected through: (a) different times of arrival of various modes, which can be detected by scanning (dithering) slightly the reference delay to identify the delay for maximum contrast at each mode; or (b) measuring the relative phase of the detected signal at various wavelength. These measurements can be applied to characterize mirrors such as, but not limited to, so-called zero-dispersion mirrors and negative dispersion mirrors. Information on absorption can be extracted by determining contrast ratio (fringe visibility) at various wavelengths. With respect to turbulence, the bandwidth of the detected signals at various wavelengths (spectrum analysis), for example through RF and optical spectrum analysis, can provide information on turbulence.

The information extracted can be detection of acoustic waves. The sample beam can be diffracted by a grating produced by acoustic waves. As the difference frequency between the reference and signal combs is scanned, large phase changes at the detection by the spectrometer may be expected when the mode splitting resonates with the acoustic wave present. In an alternative approach, the reference comb can be split into two portions, with one portion of the two portions sent collinear with the sample beam, thereby irradiating the sample liquid with two frequencies that can be tuned to the acoustic wave frequency. This procedure should result in stimulating the acoustic wave at the same time as stimulating backward Brillouin scattering.

Information can be provided with the RF spectrum at each wavelength having new frequencies, corresponding to Raman or Brillouin emission. Information can be obtained by scanning the dual frequency difference or by the repetition rate of the main dual comb laser source to detect resonances in the sample (for instance, Brillouin scattering resonance). With respect to absorption information, the modulation depth versus wavelength is a measure of the absorption spectrum of the sample traversed.

An embodiment of a laser dual comb source can be implemented for use in Brillouin spectroscopy. A short optical pulse produces an acoustic wave in a liquid, gas, or solid sample, which will in turn backscatter the optical wave. If the optical pulse is repeated at a rate equal to the acoustical wave period or a multiple thereof, the interaction is enhanced. The stimulated backward optical pulses that result can be used to characterize the sample.

Figure 5:
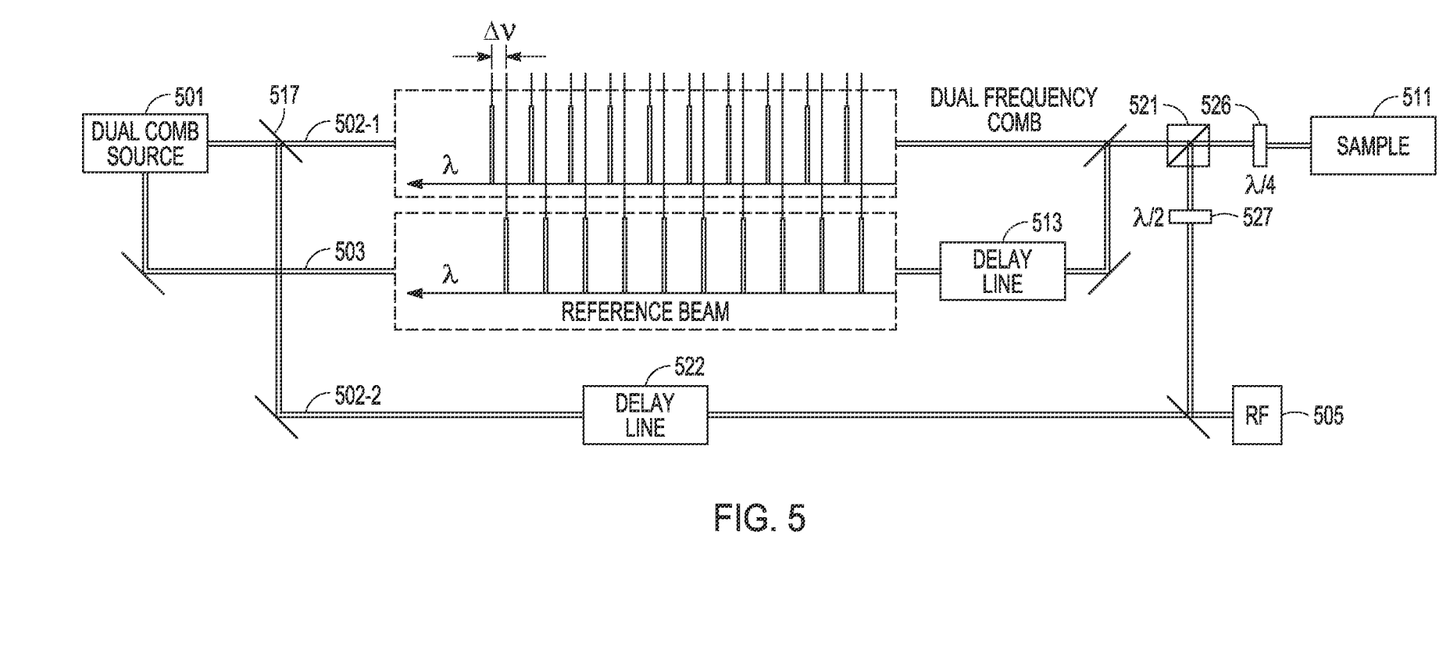
FIG. 5 illustrates an example arrangement of a dual comb source and a radio frequency spectrometer with respect to a sample to be investigated, according to various embodiments.

FIG. 5 illustrates an embodiment of an example arrangement (setup) of a dual comb source 501 and a RF spectrometer 505 with respect to a sample 511 to be investigated. This arrangement can be implemented with respect to acoustic waves in sample 511. The example setup can be viewed as a modification of the setup of FIG. 4. As in the basic setup of FIG. 4, dual comb source 501 emits two pulse trains of exactly the same repetition rate, which can be tuned or scanned, but slightly shifted in optical frequency. This corresponds in frequency to two nearly identical (same tooth spacing) frequency combs slightly frequency shifted with respect to each other. The signal beam will be diffracted by a grating produced by the acoustic waves. One of the two frequency combs is split, using a splitter 517, into a signal beam 502-1 directed to sample 511 and a signal beam 502-2 directed to RF spectrometer 505 after propagating through a delay line 522. The other one of the two frequency combs is directed to a delay line 513 as a reference beam. Signal beam 502-2 provides an additional reference. Signal beam 502-1 and reference beam 503 are sent colinear to the sample 511 to be analyzed. Beam splitter 521 directs signal beam 502-1 and reference beam 503 through quarter-wave plate 526 to sample 511. The backscattered signal is directed to RF spectrometer 505 through a half-wave plate 527.

Both the repetition rate and the frequency shift between the two combs can be scanned to find maxima in the stimulated backward Brillouin scattering in sample 511. The frequency shift is observed, using RF spectrometer 505 for example, as peaks in the RE spectrum of the mixing of return signal with one of the frequency combs. As the difference frequency between the reference and signal combs is scanned, large phase changes are expected at the detection when the mode splitting resonates with the acoustic wave. Each pair of temporally coincident pulses creates a phonon and a Stokes wave propagating towards the dual comb source 501. The repetition rate of the dual comb source 501 can be adjusted to achieve the condition of stimulated Brillouin scattering, reflected in FIG. 6.

Figure 6:
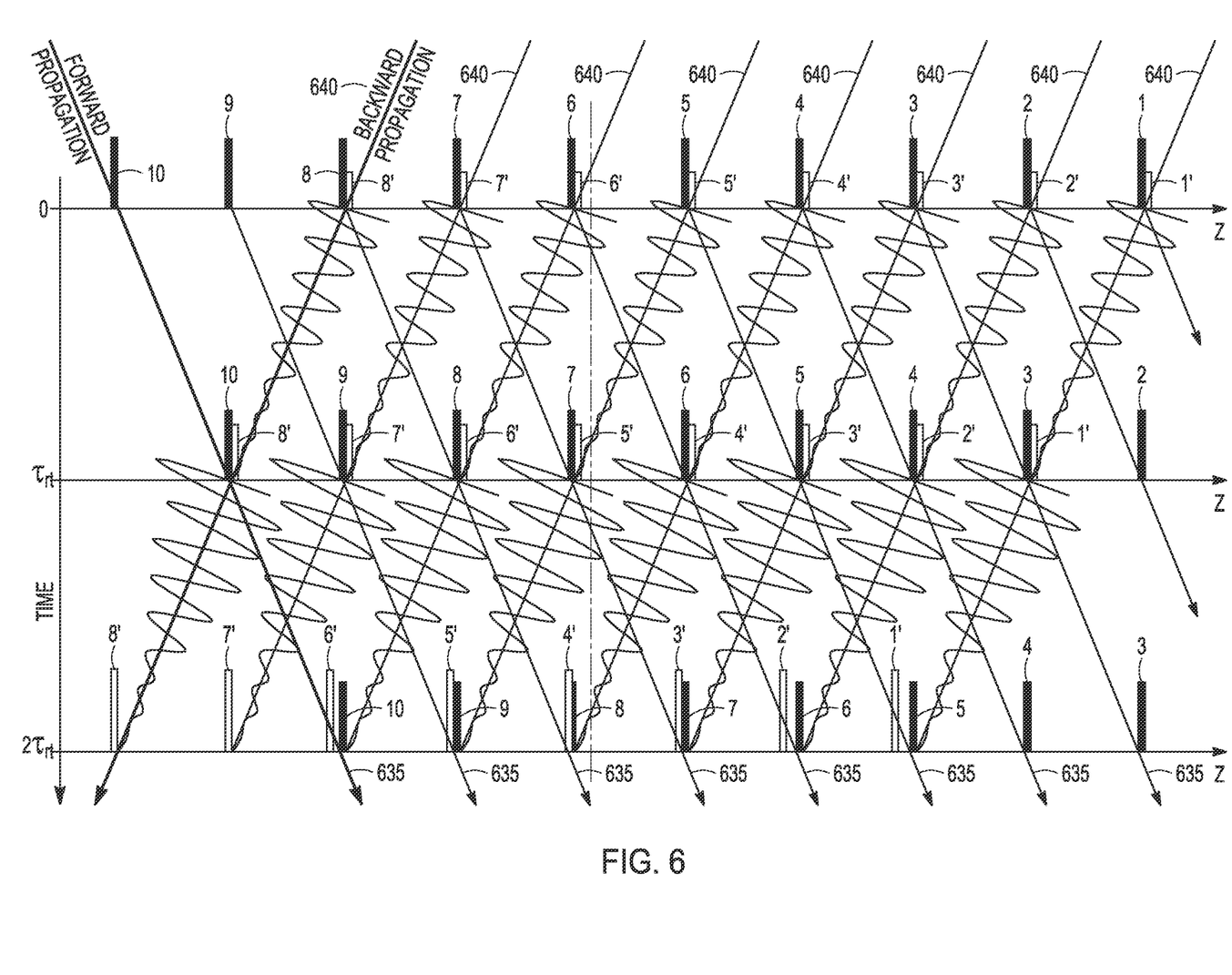
FIG. 6 shows pulses in a time, z direction diagram for the arrangement of FIG. 5, according to various embodiments.

FIG. 6 shows pulses in a time, z direction diagram. In FIG. 6, a group of 10 pulses are emitted, where the pulses are represented by vertical lines numbered 1 to 10. The time interval between pulses is $\tau_{rt}$, corresponding to a distance (along z) between pulses of $c\tau_{rt}$. Each pulse propagates forward along a direction represented by a respective line 635 in the z, t diagram. Consider the evolution of the physical phenomena beginning with pulse number 5, starting at t=0. Upon impact with a liquid or gas in which the beam propagates, the ultrashort pulse creates an acoustic wave, represented by the wiggly line shown starting at t=0 for pulse number 5. If $\tau_{rt}$ is a multiple of the period of the acoustic wave, shown as 8 periods in a non-limiting example in FIG. 6, the backward propagating wave will be amplified by pulse 7 of the train, which will coincide with the backward going motion of the acoustic wave (provided the acoustic wave does not decay completely in a time $\tau_{rt}$). Simultaneously with the amplification of the acoustic wave, a backward propagating optical wave (along directional line 640) at the frequency of the forward propagating pulse minus the frequency of the acoustic wave. The backward propagating optical wave is a Stokes wave. This growing backscattered pulse (the "signal") is represented by the vertical line 5' (5 prime). The amplification of both the acoustic wave and the Stokes wave continues at the next round-trip time increment with pulse 9 along direction 640 from backscattered pulse 5' corresponding to pulse number 5 at t=0. Similar actions occur for the other pulses represented by vertical lines numbered 1 to 10.

There are several resonance conditions to be exploited to enhance the signal:
1. Much stronger acoustic waves are generated if two intertwined frequency combs are launched, overlapping in time, but separated in frequency by the acoustic frequency. (This is the situation assumed in FIG. 6, where the initial train at t=0 includes numbered (N) and numbered' (N') pulses.)
2. The repetition rate $\tau_{rt}$ is a multiple of the acoustic wave period. These resonances in the backscattered Stokes signal allow for identification of the material traversed by the interrogating beam. At detection, a signal train and reference train are overlapped. Additional information on the material sampled is obtained by scanning a delay line on the reference beam to obtain a cross-correlation of the signal and reference, leading to the temporal shape of the Stokes signal.

The technique associated with example arrangement of dual comb source 501 and RF spectrometer 505 in FIG. 5 is not limited to Brillouin shifts, but can also be applied to Raman shifts. In general, the Raman shifts may be larger than the teeth spacing of the comb, resulting in an indetermination in the number of teeth covered by the Raman shift.

Various laser dual comb sources that can be used in arrangements, as taught herein, can include a number of characteristics. The characteristics can include circulation of two pulses in a linear or ring laser configuration, extraction of pulses from the laser cavity that results in two frequency combs with these two frequency combs having the same tooth spacing, but a frequency difference that can be tuned between a fraction of Hz and half of the repetition rate of the laser, and correlation of the two frequency combs without electronic stabilization, which correlation means that the two frequency combs can interfere with each other, producing a beat note with a frequency resolution smaller than 0.2 Hz.

Figure 7:
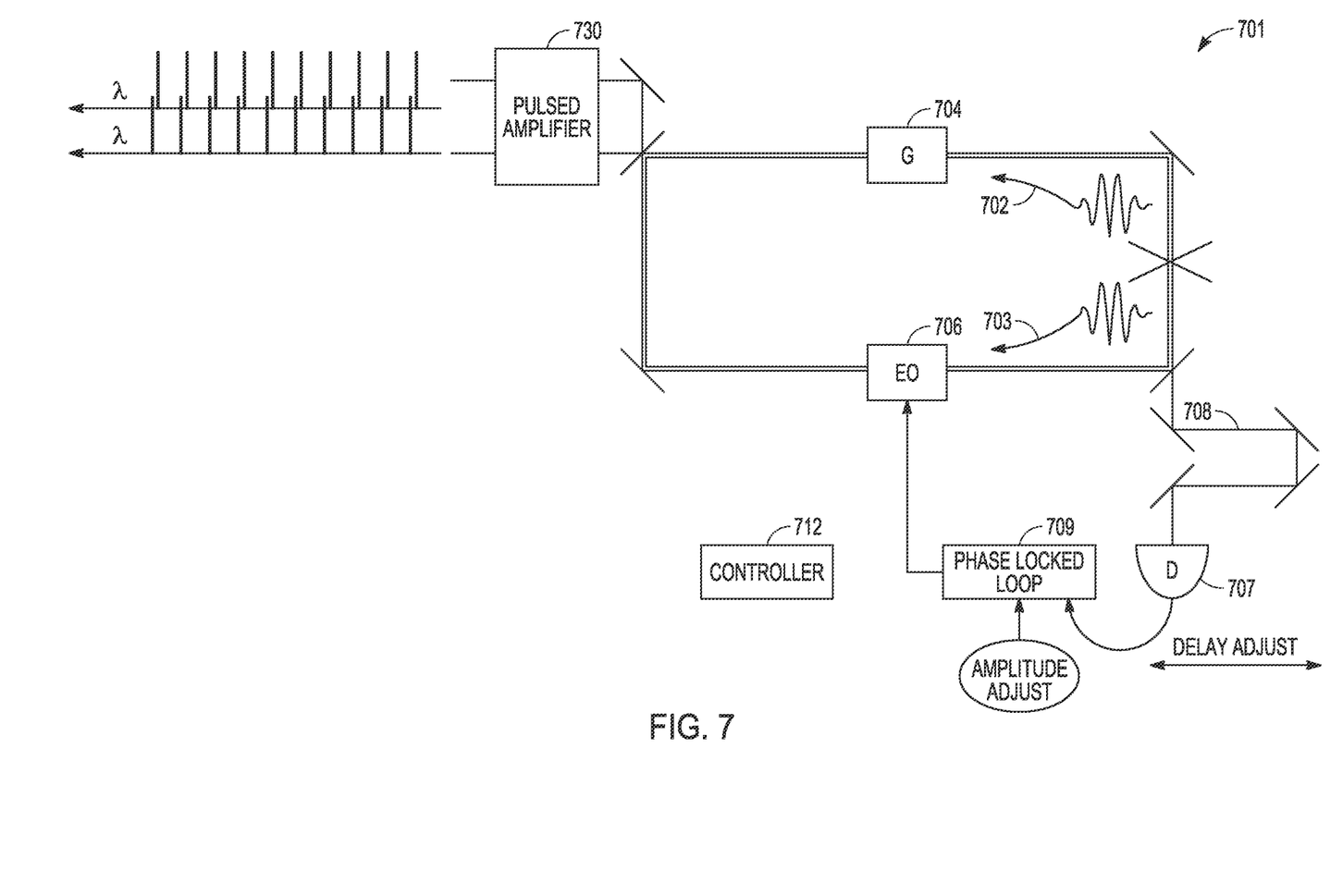
FIG. 7 illustrates a dual comb source in which both a reference beam and a signal beam are output through the same pulsed amplifier, according to various embodiments.

A laser dual comb source arrangement can be use in applications dealing with spatial localization. Depending on the application, a resolution ranging from sub-micron to 100 m may be desired. A frequency comb can be structured in time in a train of pulses separated by nanoseconds. Adjusting the length of the delay line in laser dual comb source arrangements, such as shown in FIGS. 1 and 3, in the range of 100 mm to 10 cm to maximize contrast (visibility) of the signal provides localization in that range. For long range localization (10 cm to 100 m), a standard technique used with continuous wave (cw) He-Ne lasers can be implemented. This standard technique consists of amplitude modulating the laser beam or pulsing it similar to pulsing in the radar application. This technique has the disadvantage of wasting a large portion of the energy contained in the comb. In various embodiments, a simple means of pulsing can be realized by use of a pulsed nanosecond amplifier following a double comb source as shown in FIG. 7. Pulsed time-of-flight detection (range gating) allows selection of the region to be analyzed.

FIG. 7 illustrates a dual comb source 701 in which both a reference beam 702 and a signal beam 703 are output through the same pulsed amplifier 730. Signal beam 703 and reference beam 702 generated by laser dual comb source 701, in the frequency spectrum, correspond to two identical frequency combs. The relative frequency of the two combs can be shifted by means of a detector (D 707) and an electro-optic phase modulator (EO 706). EO 706 can be realized by a slab of lithium niobate coated with two electrodes. Successive pulses 703 in hitting D 707 are sent to a phase locked loop 709 to generate a periodic wave, such as a sine wave or as a square wave as shown in FIG. 3, with a period equal to the repetition rate, $\tau_{rt}$, of the laser dual comb sources 701. With proper adjustment of an optical delay line 708, the electric signal applied to the crystal will be maximum when the crystal transmits pulse 703, and minimal when pulse 702 traverses the crystal. Therefore, pulse 702 and pulse 703 in laser dual comb sources 701 see different cavity lengths. Since the optical frequency is determined by the length of a resonator, the two frequency combs in laser dual comb sources 701 will be shifted with respect to each other by an amount proportional to the voltage applied on modulator EO 706.

The arrangement of laser dual comb source 701 can include a controller 712 operable with optical delay line 708, detector 707, and phase locked loop 709. Controller 712 can be implemented to control amplitude adjustment of phase locked loop 709, which adjusts EO 706, and to control delay adjustment of optical delay line 708. The delay adjustment to optical delay line 708 can be realized using instrumentality to move mirrors associated with optical delay line 708. Such instrumentality can include piezoelectric components.

The structure of laser dual comb sources, as taught herein, differs from conventional double comb spectroscopy (DCS) in that two combs of different repetition rates are used in DCS, while two combs of the same repetition rate are output by laser dual comb sources, taught herein, but shifted in frequency by an adjustable amount. The two methods can be viewed as complementary, but with different goals.

DCS generally requires two stabilized lasers, where the main goal of DCS is to exploit the resolution of frequency combs. This is achieved by using the radio frequency beat note between adjacent teeth of the two combs of different repetition rates to identify the exact tooth frequency being interrogated. This is equivalent to compressing the optical frequency scale to a radio frequency scale. Conventional DCS requires two independent sources of femtosecond frequency comb, stabilized. Without stabilization to a common reference, no correlation can be established between the optical frequency and the RF frequency. Typically, the laser pulses in DCS have to be of a few femtoseconds (fs), in order to cover a broad frequency range.

Correlated frequency combs, as taught herein, can be implemented with only a single unstabilized laser source. In various embodiments, a method of correlated frequency combs uses only a single laser, not stabilized, hence a considerably simpler apparatus. The single laser emits two frequency combs of the same repetition rate, but different frequency. Because the two combs are correlated and have the same repetition rate, they can be made to interfere with each other creating a beat note of less than 1 Hz bandwidth, or more than $10^6$ narrower than the bandwidth of the individual modes. A spectrometer can be used to select a spectral range. The laser used in various embodiments of a laser dual comb source does not need to generate femtosecond pulses to cover a broad spectral range. It can simply be wavelength tunable.

Typically, DCS is limited by finite linewidth and drift of the combs. The repetition rate increment from one tooth to the next $\Delta f$ is small to get large optical bandwidth. Acquisition time is approximately $1/\Delta f$. In DCS, $\Delta f$ is variable across the spectrum, which limits the number of oscillators (tooth pairs) oscillating in phase to create an RF signal. If there are M spectral elements, the signal to noise (SNR) per spectral element is expected to scale as $1/\sqrt{M}$. This value only becomes $1/M$ if only one detector is used.

In various embodiments, methods with correlated frequency combs can be implemented with smaller values of M, and with only one detector per spectral element. In fact, all the spectral elements collected by a single detector can emit in phase, resulting in an RF signal with 100% modulation depth. This new correlated comb spectroscopy can use a mode-locked laser in which two pulses circulate independently. The two intracavity pukes can be forced to have the same repetition rate by various methods such as, but not limited to, use of a saturable absorber, or use of gain modulation in the case of an optical parametric oscillator. The frequency shift between the two correlated combs can be controlled by an intracavity modulator. Such an intracavity modulator can be an electro-optic modulator, such as but not limited to a plate of lithium niobate, driven at the cavity repetition rate or a Faraday rotator between two quarter wave plates.

Figure 8:
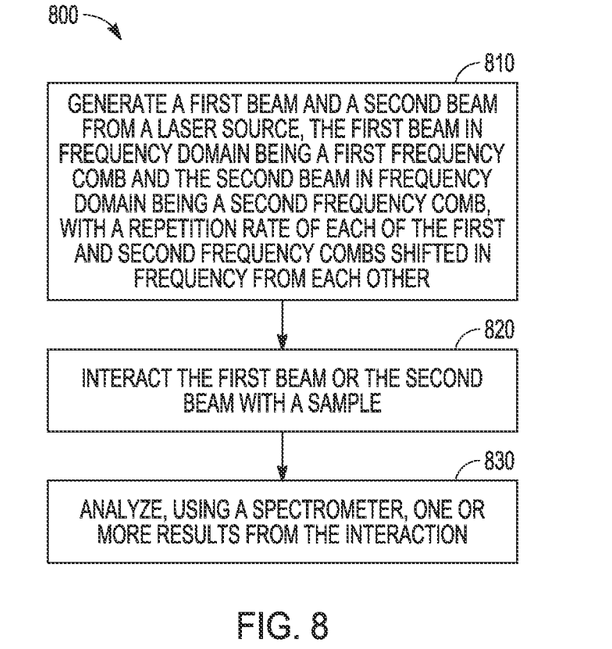
FIG. 8 is a flow diagram of features of an example method of measuring characteristics of a sample using correlated multiple frequency combs, according to various embodiments.

FIG. 8 is a flow diagram of features of an embodiment of an example method 800 of measuring characteristics of a sample using correlated multiple frequency combs. At 810, a first beam and a second beam are generated from a single laser source, the first beam in frequency domain being a first frequency comb and the second beam in frequency domain being a second frequency comb, with a repetition rate of each of the first and second frequency combs being equal. The first and second frequency combs are shifted in frequency from each other. Generating the first frequency comb shifted in frequency from the second frequency comb can include using a phase modulator in a cavity of the single laser source, with the frequency shift adjusted in a range of a fraction of a Hz to several GHz.

At 820, the first beam or the second beam is interacted with a sample. The sample can be in the form of a gas, a liquid, or a solid. In various embodiments, one of the first and second beams is used as a signal beam and the other one of the first and second beams is used as a reference beam. The reference beam can be used after propagating through a delay structure. The delay structure can be provided by a set of mirrors, for example. The signal beam can be used to interact with the sample, with the reference beam directed to an analyzer, which can be, but is not limited to, a spectrometer. Alternatively, the signal beam and a delay version of the reference bream can be used to interact with the sample. At 830, one or more results from the interaction are analyzed. A spectrometer can be used in the analysis.

Variations of method 800 or methods similar to method 800 can include a number of different embodiments that may be combined depending on the application of such methods and/or the architecture of devices or systems in which such methods are implemented. Such methods can include delaying the first beam with the first beam being a reference beam, and receiving, in a spectrometer, the reference beam directed from the delay structure and receiving a signal beam from the sample, the signal beam being a version of the second beam after interaction of the second beam with the sample. The spectrometer can be arranged such that the reference beam from the delay structure interferes with the signal beam from the sample.

Variations of method 800 or methods similar to method 800 can include, with the sample being a gas, simultaneously detecting absorption, changes in index of refraction, and turbulence in the gas from the interference of the reference beam and the signal beam in the spectrometer. Variations can include, with the sample being a liquid or a solid, simultaneously detecting absorption, changes in index of refraction, and structural changes in the liquid or the solid from the interference of the reference beam and the signal beam in the spectrometer. The detection can be performed remotely. A dual frequency comb measurement can interrogate a sample and collect signals from response of the sample to the interrogation with the sample disposed external to the components of the dual frequency comb measurement.

Variations of method 800 or methods similar to method 800 can include receiving, in the spectrometer, stimulated backward optical pulses in response to the first beam and the second beam interacting with the sample. Variations can include, with both the first beam and the second beam interacting with the sample, directing the first beam along a first path as a signal beam and along a second path as a signal-reference beam, and delaying the signal-reference beam and sending the delayed signal-reference beam to the spectrometer.

In various embodiments, a system can comprise a single laser source, a delay line, and a spectrometer. The single laser source can be operable to generate a first beam and a second beam, where the first beam in frequency domain is a first frequency comb and the second beam in frequency domain is a second frequency comb. The repetition rate of each of the first and second frequency combs is equal, and the first and second frequency combs are shifted in frequency from each other. The delay structure can be arranged to operatively delay the first beam, with the first beam being a reference beam. The spectrometer can be arranged to receive the reference beam directed from the delay structure and to receive a signal beam from a sample, where the signal beam is a version of the second beam after interaction of the second beam with the sample. The spectrometer can be arranged such that operationally the reference beam from the delay structure interferes with the signal beam from the sample. The single laser source can include a phase modulator located in the laser cavity. The phase modulator can be operable to adjust the frequency shift in a range of a fraction of a hertz to several gigahertz.

Variations of such a system can include a number of different embodiments that may be combined depending on the application of such systems and/or the architecture in which such systems are implemented. Such systems can include the spectrometer having an array of detectors. The array of detectors can be an array of radio frequency detectors.

Variations of such a system or a similar system can include different interactions for different samples. The interaction can be a transmission through the sample. The interaction can be a reflection from the sample. The interaction can include a backscattering from a gas, a liquid, or a solid.

Variations of such a system or a similar system can include the single laser source having an operationally pulsed amplifier from which the two frequency combs are output. Variations can include the spectrometer arranged to detect simultaneously absorption, changes in index of refraction, and turbulence in a gas. Variations can include the spectrometer arranged to detect simultaneously absorption, changes in index of refraction, and structural changes in a liquid or a solid from the interference of the reference beam and the signal beam in the spectrometer.

In various embodiments, a system can comprise a single laser source and spectometer. The single laser source can be operable to generate a first beam and a second beam, where the first beam in frequency domain is a first frequency comb and the second beam in frequency domain is a second frequency comb, with a repetition rate of each of the first and second frequency combs being equal and with the first and second frequency combs shifted in frequency from each other. The spectrometer can be arranged to receive stimulated backward optical pulses in response to the first beam and a second beam interacting with a sample.

Variations of such a system can include a number of different embodiments that may be combined depending on the application of such systems and/or the architecture in which such systems are implemented. Such systems can include a splitter, a first delay structure, a second delay structure, and a beam splitter. The splitter can be arranged to direct the first beam along a first path as a signal beam and, along a second path as a signal-reference beam. The first delay structure can be arranged to operatively delay the signal-reference beam and send the delayed signal-reference beam to the spectrometer. The second delay structure can be arranged to operatively delay the second beam, with the second frequency comb being a reference beam. The beam splitter can be arranged to colinearly direct the signal beam and the reference beam from the second delay structure to the sample, with the spectrometer arranged to receive the stimulated backward optical pulses generated from interaction of the signal beam and the reference beam at the sample. The spectrometer can be a radio frequency spectrometer.

Figure 9:
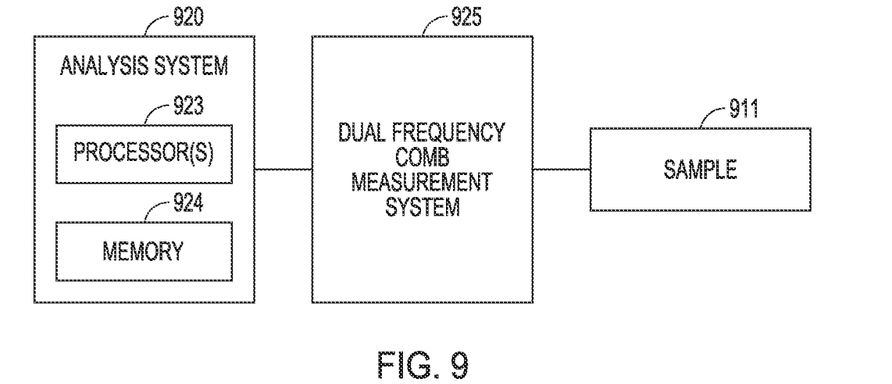
FIG. 9 is a block diagram of an example an arrangement using dual frequency combs to make measurements of a sample, according to various embodiments.

FIG. 9 illustrates an embodiment of an example arrangement using dual frequency combs to make measurements of a sample 911. The arrangement includes a dual frequency comb measurement system 925 that operates on sample 911. The dual frequency comb measurement system 925 can include a laser dual comb source and a spectrometer or variations thereof arranged according to any of the laser dual comb source and a spectrometer arrangements as taught herein. The dual frequency comb measurement system 925 generates multiple beams, which beams in the frequency domain are frequency combs having the same repetition rate, but shifted in frequency, and directs one or more of the multiple beams to interrogate sample 911. Sample 911 can be remote from the dual frequency comb measurement system 925. Signals generated from interaction of the interrogating beams with the sample are collected in the dual frequency comb measurement system 925. The dual frequency comb measurement system 925 can be coupled, wired or wirelessly, to an analysis system 920 to process information regarding the sample, which information is obtained through the interrogation by the dual frequency comb measurement system 925. The analysis system can include a memory 924 storing instructions and one or more processors 923 to execute the instructions to process the information obtained through the interrogation by the dual frequency comb measurement system 925. The instructions executed by the one or more processes 923 can include instructions to control the dual frequency comb measurement system 925.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. The above description is intended to be illustrative, and not restrictive, and the phraseology or terminology employed herein is for the purpose of description. Combinations of the above embodiments and other embodiments will be apparent to those of skill in the art upon studying the above description.

What is claimed is:

1. A system comprising:
   a single laser source having a laser cavity, the single laser source structured to generate a first beam and a second beam within the laser cavity and output the first beam and the second beam from the single laser source, the first beam in frequency domain being a first frequency comb and the second beam in frequency domain being a second frequency comb, with a repetition rate of each of the first and second frequency combs being equal and with the first and second frequency combs shifted in frequency from each other;
   a delay structure arranged to operatively delay the first beam, the first beam being a reference beam; and
   a spectrometer to receive the reference beam directed from the delay structure and to receive a signal beam from a sample, the signal beam being a version of the second beam after interaction of the second beam with the sample, with the spectrometer arranged such that operationally the reference beam from the delay structure interferes with the signal beam from the sample.

2. The system of claim 1, wherein the single laser source includes a phase modulator in the laser cavity.

3. The system of claim 2, wherein the phase modulator is operable to adjust the frequency shift in a range of a fraction of a hertz to several gigahertz.

4. The system of claim 1, herein the spectrometer includes an array of detectors.

5. The system of claim 4, wherein the array of detectors is an array of radio frequency detectors.

6. The system of claim 1, the interaction is a transmission through the sample.

7. The system of claim 1, wherein the interaction is a reflection from the sample.

8. The system of claim 1, wherein the interaction includes a backscattering from a gas, a liquid, or a solid.

9. The system of claim 1, wherein the single laser source includes an operationally pulsed amplifier from which the first beam and the second beam are output.

10. The system of claim 1, wherein the spectrometer is arranged to detect simultaneously absorption, changes in index of refraction, and turbulence in a gas.

11. A system comprising:
    a single laser source having a laser cavity, the single laser source structured to generate a first beam and a second beam within the laser cavity and output the first beam and the second beam from the single laser source, the first beam in frequency domain being a first frequency comb and the second beam in frequency domain being a second frequency comb, with a repetition rate of each of the first and second frequency combs being equal and with the first and second frequency combs shifted in frequency from each other; and
    a spectrometer arranged to receive stimulated backward optical pulses in response to the first beam and the second beam interacting with a sample, with one of the first beam or the second beam being a reference beam.

12. The system of claim 11, wherein the system includes:
    a splitter to direct the first beam along a first path as a signal beam and along a second path as a signal-reference beam;
    a first delay structure arranged to operatively delay the signal-reference beam and send the delayed signal-reference beam to the spectrometer;
    a second delay structure arranged to operatively delay the second beam, the second beam being a reference beam; and
    a beam splitter to colinearly direct the reference beam from the second delay structure and the signal beam to the sample, with the spectrometer to receive the stimulated backward optical pulses generated from interaction of the signal beam and the reference beam at the sample.

13. The system of claim 12, wherein the spectrometer is a radio frequency spectrometer.

14. A method comprising:
    generating a first beam and a second beam within a laser cavity of a single laser source and outputting the first beam and the second beam from the single laser source, the first beam in frequency domain being a first frequency comb and the second beam in frequency domain being a second frequency comb, with a repetition rate of each of the first and second frequency combs being equal and with the first and second frequency combs shifted in frequency from each other;
    interacting the first beam or the second beam with a sample; and
    analyzing, using a spectrometer arranged to receive inputs from propagation of the first beam and the second beam with one of the first beam or the second beam being a reference beam, one or more results from the interaction.

15. The method of claim 14, wherein the method includes generating the first beam shifted in frequency from the second beam using a phase modulator in the laser cavity of the single laser source, with the frequency shift adjusted in a range of a fraction of a hertz to several gigahertz.

16. The method of claim 14, wherein the method includes comprising:
    delaying the first beam using a delay structure, the first beam being a reference beam; and
    receiving, in the spectrometer, the reference beam directed from the delay structure and receiving a signal beam from the sample, the signal beam being a version of the second beam after interaction of the second beam with the sample, with the spectrometer arranged such that the reference beam from the delay structure interferes with the signal beam from the sample.

17. The method of claim 16, wherein the method includes simultaneously detecting absorption, changes in index of refraction, and turbulence in a gas from the interference of the reference beam and the signal beam in the spectrometer.

18. The method of claim 16, wherein the method includes simultaneously detecting absorption, changes in index of refraction, and structural changes in a liquid or a solid from the interference of the reference beam and the signal beam in the spectrometer.

19. The method of claim 14, wherein the method includes receiving, in the spectrometer, stimulated backward optical pulses in response to the first beam and the second beam interacting with the sample.

20. The method of claim 19, wherein the method includes:
   directing the first beam along a first path as a signal beam and along a second path as a signal-reference beam; and
   delaying the signal-reference beam and sending the delayed signal-reference beam to the spectrometer.

\* \* \* \* \*

UNITED STATES PATENT AND TRADEMARK OFFICE
CERTIFICATE OF CORRECTION

| | | |
|---|---|---|
| PATENT NO. | : 11,821,838 B1 | Page 1 of 1 |
| APPLICATION NO. | : 17/335867 | |
| DATED | : November 21, 2023 | |
| INVENTOR(S) | : Diels et al. | |

It is certified that error appears in the above-identified patent and that said Letters Patent is hereby corrected as shown below:

In the Claims

In Column 11, Line 55, in Claim 4, delete "herein" and insert --wherein-- therefor In Column 11, Line 59, in Claim 6, before "the", insert --wherein--

Signed and Sealed this
Fourth Day of February, 2025

Coke Morgan Stewart
*Acting Director of the United States Patent and Trademark Office*